March 27, 1956  S. E. BALTER  2,739,401

STEREOPTICON FILM MOUNT

Filed Oct. 30, 1952

SALLYE E. BALTER
INVENTOR

BY Samuel J. Steel
ATTORNEY

United States Patent Office 2,739,401
Patented Mar. 27, 1956

2,739,401

STEREOPTICON FILM MOUNT

Sallye E. Balter, Roslyn Heights, N. Y., assignor to Jack I. Ellerstein Co., New York, N. Y.

Application October 30, 1952, Serial No. 317,739

1 Claim. (Cl. 40—158)

This invention relates to a stereopticon film mount.

Stereopticon slides are provided with two films. These two films are spaced a predetermined distance apart, depending upon whether they relate to near, distant or medium range photography. It is a conventional practice, especially when projecting stereopticon slides, to provide three separate and independent film mounts wherein it is necessary for those who engage in the art and practice of stereoptics to purchase and use three complete sets of stereoptican slides, each differing from the others only in the spacing of their respective films or film windows.

It is the principal object of this invention to provide a stereopticon film mount wherein the films are adjustable relative to each other so as to take into account or compensate for near, medium and distant photographic shots. A single mount may be used for any of these ranges with equally good results, whatever the range by providing interchangeable windows of varying sizes which provide for the various ranges.

Another important object of this invention is the provision of a stereopticon film mount which automatically aligns the top and bottom edges of the films and maintains the films in proper horizontal alignment for all purposes and at all times. Thus it is possible to shift the films either toward or away from each other in accordance with the range of the photographic shots, without loss of alignment.

This automatic alignment feature makes vertical alignment of the two films a very simple matter indeed. As a matter of fact, once the films are lined up horizontally, their vertical alignment almost follows as an automatic procedure. Assisting in this procedure are calibrations in the film mount which are used to determine and control the spacing of the films and their vertical alignment. No attention need be paid to the horizontal alignment of the films during the process of properly and accurately spacing them and vertically aligning them. Reference is here made to the different homologous points which must be considered and to the range differentials which have above been mentioned.

An exceedingly important feature of this invention is the provision of window frames for the films. Each window frame may be considered to constitute a film mount. The film is secured to the window frame and the window frame is secured to the stereopticon film mount herein claimed. This is an indirect process for securing the films to the stereopticon film mount but the advantages are manifold.

The window frame corresponds identically in height or length to the height or length of the film. When the film is mounted on the window frame therefor, the top and bottom edges of the film and window frame are accurately aligned. Windows for said window frames are provided in the stereoptican film mount and said windows also correspond in height to the height or length of said window frames and the films. Consequently, insertion of said window frames into said windows has the effect of automatically lining up the window frames horizontally and by the same token the films will also be horizontally aligned. The window frames are so situated with regard to the calibrations on the stereopticon film mount that it becomes an exceedingly simple matter to properly and accurately space the window frames and thereby to properly and accurately space the films. By the same token, it becomes a simple matter to vertically align the picture frames in relation to the homologous points and this automatically correctly aligns the films.

An important feature of this invention is the means by which the films and the window frames on which they are mounted are secured to the stereopticon film mount. A plurality of adhesive-coated flaps or tabs are provided on the mount, one above and one below each window frame mounted film, and when these flaps or tabs are moistened (if moisture is required) and then folded over upon said films and window frames, the latter becomes securely fixed in their selected positions on said mount.

An important object of this invention is the provision of an inexpensive film mount for stereoptican use. The film mount which is herein described and claimed is made of inexpensive sheet material, die-cut and folded as set forth in detail herein. The sheet material may simply be a heavy braid of paper or some form of cardboard which is die-cut to form a blank and which is provided with folding lines for folding it upon itself in the manner described. It is provided with a suitable adhesive so that it will retain its folded condition. The adhesive-coated flaps or tabs above mentioned are also die-cut out of the same piece of sheet material. The end result is an exceedingly useful, highly satisfactory stereopticon film mount, inexpensive to make and very simple to use.

A preferred form of this invention is shown in the accompanying drawing in which.

The stereopticon film mount herein claimed is made from a blank 10 which is die-cut from suitable sheet material, such as cardboard or heavy paper or the like. It is substantially rectangular in shape or outline and it is provided with a pair of score or folding lines 12 and 14 respectively which are parallel to each other. The spacing of these two folding lines and their relation to the top and bottom edges of the blank are such that they define three panels: Top panel 16, bottom panel 18 and intermediate panel 20. Panel 20 is described as being intermediate not because of its relationship to the other panels when they are all in blank form, but rather because of its relationship to the other two panels when they are folded in the manner hereinafter described.

Figure 6:
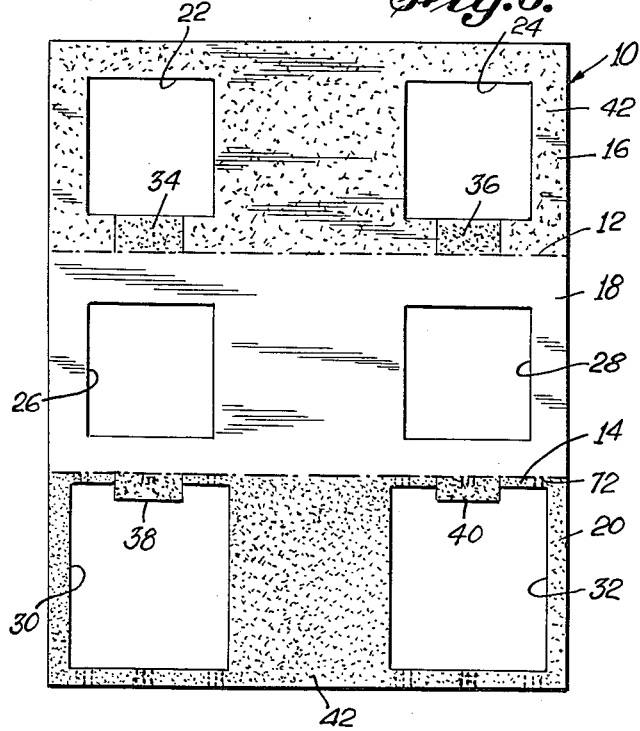
Fig. 6 is a plan view of the blank out of which said stereopticon film mount is made.
Figure 5:
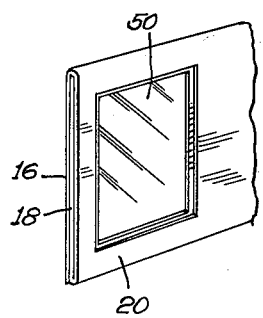
Fig. 5 is a fragmentary perspective view of the same stereopticon film mount, showing the opposite side thereof.

Windows 22 and 24 are formed in top panel 16. Identical windows 26 and 28 are formed in bottom panel 18. Larger windows 30 and 32 are formed in intermediate panel 20. Flaps or tabs 34 and 36 are formed between windows 22 and 24 on the one hand and folding line 12 on the other hand. Flaps or tabs 38 and 40 are formed between windows 30 and 32 on the one hand and folding line 14 on the other hand. These two tabs 38 and 40 project into windows 30 and 32 as Fig. 6 clearly shows.

It will be understood that a suitable gum or other adhesive is provided on the blank 10 to enable its several parts to be secured to each other when in folded condition. Thus it will appear that panels 16 and 20 are coated with an adhesive 42 and all of the tabs are similarly coated. Panel 18 is free from the adhesive coating but this is a matter of preference rather than need. The manner in which the blank is folded and secured in folded condition will now be described.

Figure 1:
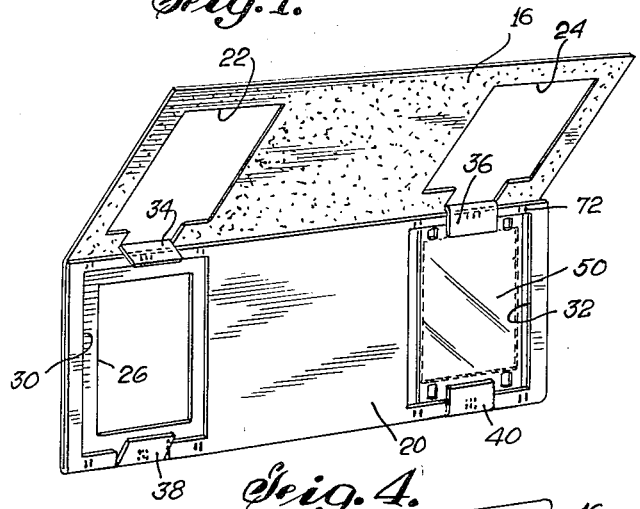
Fig. 1 is a perspective view of a stereopticon film mount, showing one film mounted therein and the top panel in elevated position preparatory to inserting a second film in said mount.
Figure 4:
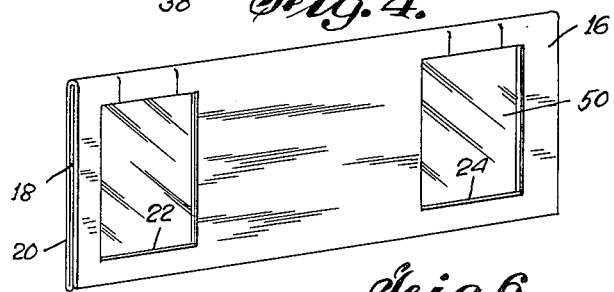
Fig. 4 is a perspective view of the stereopticon film mount herein claimed, showing both films mounted therein and showing said mount in closed and completed condition.

Panel 20 of blank 10 is folded over upon panel 18 along folding line 14. The gum or adhesive 42 is moistened or otherwise activated, if such be required, in order to secure panel 20 to panel 18. It will be understood that panel 18 may be provided with the adhesive, rather than panel 20, or both may be provided with an adhesive, with equally good results. Similarly, other fastening means than an adhesive may be employed to hold the two panels together. The folding process is completed by folding panel 16 upon the back of panel 20 and the adhesive 42 on panel 16 may then be employed to secure panels 16 and 20 together. This would complete the folding of the film mount but there are certain intermediate steps which must be taken in order to properly mount the film therein. These intermediate steps take place after panel 20 is folded upon and secured to panel 18 but before panel 16 is folded over upon and secured to panel 20. The intermediate stage is illustrated in Fig. 1. The final result is illustrated in Fig. 4.

Film 50 is cut from a continuous strip of film, the size being conventional for stereoptics. Edges 52 and 54 come from the side edges of the continuous strip of film and they are precisely parallel to each other. For convenience, edge 52 will be referred to as the top edge of film 50 and edge 54 will be referred to as its bottom edge. Side edges 56 and 58 are the cut edges along which the individual films or frames are cut from the continuous strip. These side edges are also parallel to each other but not necessarily in a precision sense.

Figure 2:
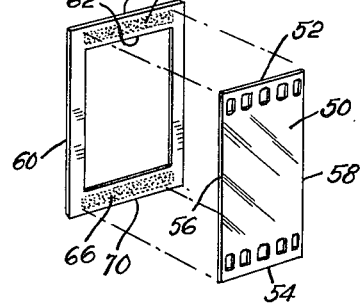
Fig. 2 is a perspective exploded view of a film and the window frame on which it is to be mounted.

Window frame or picture frame 60 is a key element of the present invention. It is simply a die-cut frame, rectangular in shape and with a rectangular opening 62 formed therein. This rectangular opening is the window in the frame through which the film may be viewed. This window or picture frame may be made of any suitable cheap material, such as heavy paper or cardboard and it would be helpful to have a metallic coating thereon on the outer side, that is, the side opposite the one which is shown in Fig. 2. Carrying this thought further it will be clear that the wndow or picture frame 60 may be made in its entirety from sheet metal, such as aluminum foil. Two adhesive strips 64 and 66 are applied to the inner surface of the upper and lower bars of the window or picture frame in order to secure the film thereto. It will be understood that the entire inner surface of the window or picture frame may be coated with an adhesive material.

Figure 3:
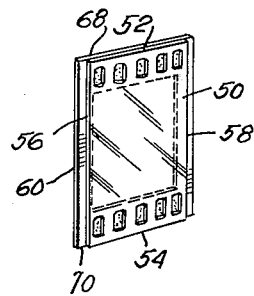
Fig. 3 is a similar perspective view but showing the film secured to said window frame.

An important aspect of this frame is its vertical dimension between its top and bottom edges 68 and 70 respectively. The length of the window or picture frame, that is the distance between its top and bottom edges, corresponds precisely to the length of the film, that is, the distance between the top and bottom edges 52 and 54 of said film. Hence when the film is placed upon the window or picture frame as shown in Figs. 2 and 3, the top and bottom edges of the film will coincide, respectively with the top and bottom edges of the window or picture frame.

Similarly, windows 30 and 32 of panel 42 of blank 10 are exactly as long as the film and its window or picture frame with just enough clearance or tolerance to render it possible to insert the window frame and its film into said windows and to move said window frame and its film laterally thereof, that is, leftwardly or rightwardly therein, as viewed in the drawing, without any perceptible or measurable vertical movement or biasing. It will appear from what has last been said, that windows 30 and 32 serve as pockets for the window frames and the films mounted thereon. This feature is clearly brought out in Fig. 1 where it will be seen that panel 18 serves as a bottom wall to prevent the window frame and its film to fall through and out of windows 30 and 32. This is the reason for the difference in size between the windows in panel 18 and the windows in panel 20 and the same reason also applies to the size differential between the windows in panel 20 and the windows in panel 16. In other words, the edges of windows 30 and 32 serve as the sides of the pockets and the marginal area surrounding windows 26 and 28 constitutes the bottom of the pockets. When panel 16 is folded over upon panel 32, following insertion and affixation of the window frames and the films mounted thereon, the marginal area surrounding windows 22 and 24 serve as the top wall of the pockets, thereby locking the window frames and their films in the film mount.

Fig. 4 shows that there is considerable clearance between the side edges of the window frames 60 and the side edges of windows 30 and 32. It is thus possible to shift the window frames sidewardly in either direction in windows 30 and 32. This can be done without distorting or affecting the horizontal alignment of the two window frames and it is thereby possible to adjust the positions of the films on said window frames relative to each other, both in respect to the homologous points and in respect to the focal range of the pictures on the frames. It will be noted that calibrations 72 are provided adjacent windows 30 and 32. These calibrations will make it easy to adjust the relative positions of the window frames and hence of the films mounted thereon. In other words, the films are adjusted indirectly but thereby more precisely. It is a simple matter to center the films on the window frames. It is a simple matter to accurately position the window frames in windows 30 and 32. Consequently, accurate positioning of the films relative to each other is achieved.

Flaps or tabs 34, 36, 38 and 40 may now be folded over upon the picture frames and the films mounted thereon. These flaps or tabs will adhesively hold said frames and said films in their selected positions and there will be no shifting or accidental dislodgment after that. Room is provided for these several flaps in the cut-outs in panels 16 and 20 from which they were formed. In other words, these flaps or tabs do not add to the thickness of the film mount herein claimed but rather do they nest in the very spaces from which they were cut out.

It will be understood that the picture or window frames herein described and claimed are all uniform in their outer or overall dimensions. They are, however, provided with window openings of various sizes. In the preferred form of this invention there are three window sizes, large for distant range, medium for intermediate range and small for near range. But even these windows are uniform in their vertical dimensions and they differ only in width. Thus it is possible to insert any of these window or picture frames in the same film mount, since their outer dimensions are all uniform. Similarly, they may be shifted either toward or away from each other irrespective of the dimensions of their window openings. In practice, the picture or window frames with large window openings for far range are spaced relatively far apart in the film mount. The picture or window frames with small window openings for near range are spaced relatively close together in the film mount. The picture or window frames with medium size window openings for intermediate range are spaced an intermediate distance apart in the film mount.

The foregoing is illustrative of a preferred form of this invention and it will clearly be understood that this preferred form may be modified and other preferred forms may be provided within the broad scope of the claims and the broad spirit of the invention.

I claim:

A stereopticon film mount, having three superimposed panels which are integral with each other along parallel folding lines and registering film windows formed in all three panels, two such windows in each panel, the windows in the upper and lower panels being smaller than the film, the windows in the intermediate panel being precisely as long as the film to accommodate the film without permitting lengthwise movement of the film toward or away from the upper and lower edges of the windows in said intermediate panel, said windows in the intermediate panel being substantially wider than the film to permit of lateral adjustment of the film both toward and away from each other and relative to the side edges of said windows in the intermediate panel, a frame being provided for each film and adhesive means for securing the film to the frame, said frames being precisely as long as the films and the intermediate windows so as to prevent longitudinal shifting of said frames both toward and away from the upper and lower edges of said intermediate windows, said frames being substantially narrower than said intermediate windows to permit of lateral adjustment of said frames toward and away from each other and relative to the side edges of said intermediate windows, the upper and lower edges of said intermediate windows serving as guides relative to the upper and lower edges of said frames to maintain said frames and the films mounted thereon during lateral adjustment of said frames relative to each other, adhesively coated flaps formed adjacent said intermediate windows for adhesively securing said frames and the films mounted thereon in place in said intermediate windows following their adjustment relative to each other and relative to the side edges of said intermediate windows, and means for holding all three panels together in superimposed positions.

References Cited in the file of this patent

UNITED STATES PATENTS

| | | |
|---|---|---|
| 1,500,025 | Mayer | July 1, 1924 |
| 2,164,655 | Kleerup | July 4, 1939 |
| 2,338,189 | Libby | Jan. 4, 1944 |
| 2,359,659 | Margulies | Oct. 3, 1944 |

FOREIGN PATENTS

| | | |
|---|---|---|
| 899,729 | France | June 8, 1945 |